US012775127B2

(12) United States Patent
Kley et al.

(10) Patent No.: US 12,775,127 B2
(45) Date of Patent: Oct. 27, 2026

(54) METHOD FOR PRODUCING A DIFFRACTIVE OPTICAL ELEMENT AND DIFFRACTIVE OPTICAL ELEMENT

(71) Applicants: Fraunhofer-Gesellschaft zur Förderung der angewandten Forschung e. V., Munich (DE); Friedrich-Schiller-Universität Jena, Jena (DE)

(72) Inventors: Ernst-Bernhard Kley, Jena (DE); Frank Schrempel, Jena (DE); Uwe Detlef Zeitner, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 988 days.

(21) Appl. No.: 17/773,669

(22) PCT Filed: Dec. 7, 2020

(86) PCT No.: PCT/EP2020/084881
§ 371 (c)(1),
(2) Date: May 2, 2022

(87) PCT Pub. No.: WO2021/116017
PCT Pub. Date: Jun. 17, 2021

(65) Prior Publication Data
US 2022/0397707 A1 Dec. 15, 2022

(30) Foreign Application Priority Data
Dec. 13, 2019 (DE) ..................... 10 2019 134 336.4

(51) Int. Cl.
*G02B 5/18* (2006.01)
*G02B 1/12* (2006.01)

(52) U.S. Cl.
CPC ............. *G02B 5/1857* (2013.01); *G02B 1/12* (2013.01)

(58) Field of Classification Search
CPC .. G02B 5/1857; G02B 1/12; G21K 2201/061; G21K 2201/062; G21K 1/06
(Continued)

(56) References Cited

U.S. PATENT DOCUMENTS 5,363,238 A * 11/1994 Akune ..................... G21K 1/06 359/569
6,919,957 B2 * 7/2005 Nikoonahad ...... G01N 21/9501 356/625

(Continued)

FOREIGN PATENT DOCUMENTS

TW 200523377 A * 7/2005

OTHER PUBLICATIONS

Galyautdinov, M. F. et al., "Formation of a Periodic Diffractive Structure Based on Poly(methyl methacrylate) with Ion-Implanted Silver Nanoparticles," ISSN 1063-7850, Technical Physics Letters, 2016, vol. 42, No. 2, pp. 182-185.

(Continued)

*Primary Examiner* — William R Alexander
*Assistant Examiner* — Alaina Marie Swanson
(74) *Attorney, Agent, or Firm* — Slater Matsil, LLP

(57) ABSTRACT

A method for producing a diffractive optical element and a diffractive optical element are disclosed. In an embodiment a method for producing a diffractive optical element includes generating a surface structure by implanting ions into a material of a substrate, a layer or a layer system, wherein the surface structure includes a structure height of less than 10 nm.

18 Claims, 2 Drawing Sheets

(58) Field of Classification Search
USPC .......................................................... 359/566
See application file for complete search history.

(56) References Cited

U.S. PATENT DOCUMENTS

| | | | | |
|---|---|---|---|---|
| 2005/0161619 | A1 | 7/2005 | Ray | |
| 2008/0149858 | A1 * | 6/2008 | Weiser | G02B 1/12 250/492.21 |
| 2009/0154871 | A1 * | 6/2009 | Pyo | G02B 6/30 438/31 |
| 2014/0043686 | A1 * | 2/2014 | Sugiyama | G02B 5/1861 359/571 |
| 2018/0095201 | A1 * | 4/2018 | Melli | G02B 27/0172 |
| 2019/0178468 | A1 * | 6/2019 | Miyazaki | G02B 5/1847 |

OTHER PUBLICATIONS

Katharria, Y. S. et al., "Self-organization of 6H—SiC (0001) surface under keV ion irradiation," J. Appl. Phys. 102, 044301 (2007), https://doi.org/10.1063/1.2769804, 7 pages.
Salman, J. et al., "Flat Optical and Plasmonic Devices Using Area-Selective Ion-Beam Doping of Silicon," Adv. Optical Mater., 2018, 6, 1701027, 2018 WILEY-VCH, Verlag GmbH & Co. KGaA, Weinheim, DOI:10.1002/adom.201701027, 6 pages.
Escoubas, L. et al., "Enhanced Diffraction Efficiency of Gratings in Multilayers," Optics Letters, Optical Society of America, US, vol. 25, No. 4, Feb. 15, 2000 (Feb. 15, 2000), ISSN: 0146-9592, pp. 194-196.
Chalifoux, B. et al., "High-precision figure correction of x-ray telescope optics using ion implantation," Optics for EUV, X-Ray, and Gamma-Ray, Astronomy VI, Edited by Stephen L. O'Dell, Giovanni Pareschi, Proc. of SPIE vol. 8861, 88610 (2013), 13 pages.
Chen, F. et al., "Chapter 13 Modification of Structure and Properties of Optical Crystals," Ion Beam Modification of Solids, vol. 61 of Springer Series in Surface Sciences, Edited by W. Wesch, W. Wendler (2016), DOI 10.1007/978-3-319-33561-2_13, pp. 501-528.
"ELI—Extreme Light Infrastructure White Book, Science and Technology with Ultra-Intense Lasers," Edited by G. A. Mourou, G. Korn, W. Sandner, J. L. Collier, THOSS Media GmbH, Berlin (2011), 536 pages.
Ono, K. et al., "Surface morphology evolution during plasma etching of silicon: roughening, smoothing and ripple formation," J. Phys. D: Appl. Phys., vol. 50, No. 41, 414001 (2017), 3 pages.
"X-Ray Optics for BES Light Source Facilities Report of the Basic Energy Sciences Workshop on X-ray Optics for BES Light, Source Facilities," Edited by D. Mills, H. Padmore, Potomac, MD, USA (2013), Mar. 27-29, 2013, 150 pages.
Schrempel, F. et al., "Ion beam enhanced etching of LiNbO3," Nuclear Instruments and Methods in Physics Research, B 250, (2006), pp. 164-168.
Siewert, F., "Metrology, Mirrors and Gratings—Advances and Challenges in Synchrotron Optics," Journal of Physics: Conference Series 425, 152001 (2013), 7 pages.

* cited by examiner

METHOD FOR PRODUCING A DIFFRACTIVE OPTICAL ELEMENT AND DIFFRACTIVE OPTICAL ELEMENT

This patent application is a national phase filing under section 371 of PCT/EP2020/084881, filed Dec. 7, 2020, which claims the priority of German patent application 102019134336.4, filed Dec. 13, 2019, each of which is incorporated herein by reference in its entirety.

TECHNICAL FIELD

The application relates to a method for producing a diffractive optical element and to the diffractive optical element producible with the method.

BACKGROUND

Diffractive optical elements such as, in particular, reflection diffraction gratings, which diffract the radiation into different angular ranges depending on the wavelength, are contained, for example, in monochromators or spectrometers. To achieve high spectral resolution and efficiency, high demands are placed on the structures to be realized.

Especially for diffractive optical elements for electromagnetic radiation with short wavelengths, for example in the EUV (extreme ultraviolet) or X-ray range, diffractive structures are difficult to produce due to the high demands on accuracy. Furthermore, in the case where the lattice planes of single crystals serve as Bragg reflectors, another problem arises. Due to the structure of the single crystal and the direction of incidence of the beam, the lattice planes and thus the phase of the Bragg reflection are predetermined. By material ablation of lattice planes, the phase of reflection can be changed only in $2\pi$-steps, which is without effect for interference and diffraction.

SUMMARY

Embodiments provide a method for producing a diffractive optical element with which low structure heights, particularly suitable for realizing phase shifts of less than $2\pi$, can be produced. Further embodiments provide a diffractive optical element.

According to at least one embodiment of the method for producing a diffractive optical element, a surface structure is produced by implanting ions into the surface of a suitable material. The surface of the material forming a surface of the diffractive optical element after generation of the surface structure by ion implantation may be the surface of a substrate, a layer applied to the substrate, or a layer system applied to the substrate.

According to at least one embodiment, the surface structure comprises a structure height of not more than 10 nm, in particular of not more than 5 nm or even not more than 1 nm. Preferably, the surface structure comprises a structure height of from 0.1 nm to 10 nm, in particular from 0.5 nm to 10 nm.

In particular, the method for producing a diffractive optical element described herein makes use of the idea that the implantation of ions creates defects in the ion implantation region, for example vacancies, interstitial atoms, substitution atoms, dislocations, stacking defects or amorphized regions. The defects can cause bond lengths to change and/or regions with altered density to form. This results in a volume change in the ion implantation region, which leads to an elevation of the surface and thus to the formation of the surface structure. The surface structure is produced in particular without the use of material-removing methods such as etching processes. Advantageously, the method can be used to produce low structure heights of less than 10 nm or even less than 1 nm, which would not be readily producible with the accuracy required for diffractive optical elements using conventional etching methods.

According to at least one embodiment, the surface structure is generated with a structure height that varies in the lateral direction. The lateral direction is understood here and in the following to be a direction parallel to the surface of the diffractive optical element. The elevation of the surface and the resulting structure height can be selectively adjusted by a location-dependent ion implantation. The structure height can be varied stepwise or continuously. In particular, the surface structure can be a periodic structure. The period is preferably from 50 nm to 500 nm. It is also possible that the period varies in the lateral direction. In this case, the surface structure is, for example, a chirped grating.

According to at least one embodiment, the ion implantation is performed through a patterned mask layer. In this case, the spatial resolution of the surface structure in the lateral direction is specified by the patterned mask layer. The structured mask layer can be a so-called binary mask layer, which comprises openings between regions impermeable to the ions used. In this case, the ions are implanted into the surface of the material essentially only in the regions of the openings in the structured mask layer. In this way, for example, a surface structure can be created with a step profile. Alternatively, the mask layer may comprise a height profile that allows ion implantation with energy and concentration varying in the lateral direction. In this way, in particular, a continuous variation of the structure height can be achieved. The mask layer is preferably a metal layer, for example a chromium layer or gold layer. However, the mask layer may also comprise other materials, such as metal oxides, polymers or resists.

According to a further embodiment, the ion implantation is performed by means of an ion beam limited in lateral direction, wherein the ion fluence of the ion beam is varied during the ion implantation. In this case, the variation of the ion fluence causes the structure height to vary in the lateral direction. In this way, a stepwise or continuously varying structure height can be generated. Local variation of the ion fluence advantageously allows complex surface structures to be generated. In this embodiment of the method, the surface structure is generated sequentially by the ion beam.

According to at least one embodiment, the ions are implanted to an implantation depth between 10 nm and 500 nm. The ion implantation depth is understood here to be the depth at which the ion concentration comprises its maximum. The implantation depth can be specifically adjusted in particular by the ion energies of the implanted ions, but also by the ion mass and the density of the material.

According to at least one embodiment, the ion energy during ion implantation is between 2 keV and 100 keV. The implanted ions can be, for example, noble gas ions such as argon ions or helium ions, which do not affect the further physical properties of the material, or substitution atoms of the material of the substrate, layer or layer system.

According to at least one embodiment, the structure height h of the surface structure is a non-integer multiple of the lattice plane spacing a of the material or, if the diffractive optical element comprises a layer system, a non-integer multiple of the thickness of a single layer of the layer system of the diffractive optical element. Here, the grating plane spacing a means the grating plane spacing in the vertical direction, i.e. perpendicular to the substrate or the layer. If the structure height h of the surface structure is a non-integer multiple of the grating plane spacing a or, if the diffractive optical element comprises a layer system, a non-integer multiple of the thickness of a single layer of the layer system, phase shifts that are not equal to 27π can advantageously be generated when using the surface structure as a diffractive optical element.

According to at least one embodiment, the structure height h of the surface structure is less than a lattice plane spacing a of the material or, if the diffractive optical element comprises a layer system, less than the thickness of a single layer of the layer system of the diffractive optical element. Advantageously, with the ion implantation method described herein, structure heights h of the surface structure can be generated that are smaller than the lattice plane spacing a or, if the diffractive optical element comprises a layer system, smaller than the thickness of a single layer of the layer system. Such small structure heights could not be readily produced with conventional material ablation methods, since whole atomic layers are ablated with such methods. In contrast, the ion implantation described herein can create defects that result in elevations of the surface by a structure height h smaller than the lattice plane spacing a, for example, by changing the bond lengths and or density of the material. Preferred values for the structure height are, for example, h=a/2n, where n is an integer, i.e., h=a/2, h=a/4, h=a/6, etc. For example, a structure height of h=a/2 is suitable to produce a phase difference of it. Depending on the energy or wavelength, higher orders of Bragg can be used, especially for a diffractive optical element for EUV or X-rays. These higher orders of Bragg reflection occur when the structure height is advantageously a/4, a/6, etc.

According to at least one embodiment, the structure height is achieved by temperature treatment of the substrate, layer or layer system after ion implantation. This is caused by the healing and remodeling of part of the defects created during the ion implantation. The structure height can be selectively adjusted by the level of the temperature and the duration of the temperature treatment. For example, the temperature can range from 100° C. to 900° C. The duration of the temperature treatment can be from a few seconds to a few hours. The temperature treatment can be performed in an oven under a gas atmosphere. For example, the atmosphere may include air, vacuum, or gases such as oxygen or argon.

A diffractive optical element is further specified. According to at least one embodiment, the diffractive optical element comprises a surface structure formed in a substrate or layer of the diffractive optical element, wherein the surface structure comprises a structure height of less than 10 nm, and wherein the substrate or layer comprises an ion implantation region beneath the surface structure.

According to at least one embodiment, the diffractive optical element is a reflection diffraction grating. In particular, the diffractive optical element may comprise a surface structure suitable for diffraction of EUV radiation or X-rays. For example, the diffractive optical element may be provided for diffraction of EUV or X-ray radiation, particularly with wavelengths from about 0.1 nm to 50 nm.

In one embodiment, the diffractive optical element may comprise an uncoated substrate in which the surface structure is created. In particular, the substrate may be a single crystal. Alternatively, it is possible that the substrate is an amorphous substrate. In a further embodiment, the diffractive optical element comprises a substrate provided with a layer or layer system, wherein the surface structure is generated in the layer or in the uppermost layer of the layer system.

For example, the layer system is a mirror layer system for reflecting EUV or X-ray radiation.

The advantageous embodiments described previously in connection with the method also apply to the diffractive optical element and vice versa.

BRIEF DESCRIPTION OF THE DRAWINGS

The method and the diffractive optical element are explained in more detail below by means of examples in connection with FIGS. 1 to 4.

In the Figures.

DETAILED DESCRIPTION OF ILLUSTRATIVE EMBODIMENTS

Components which are identical or have the same effect are marked with the same reference signs in the figures. The components shown as well as the proportions of the components among each other are not to be regarded as true to scale.

Figure 1:
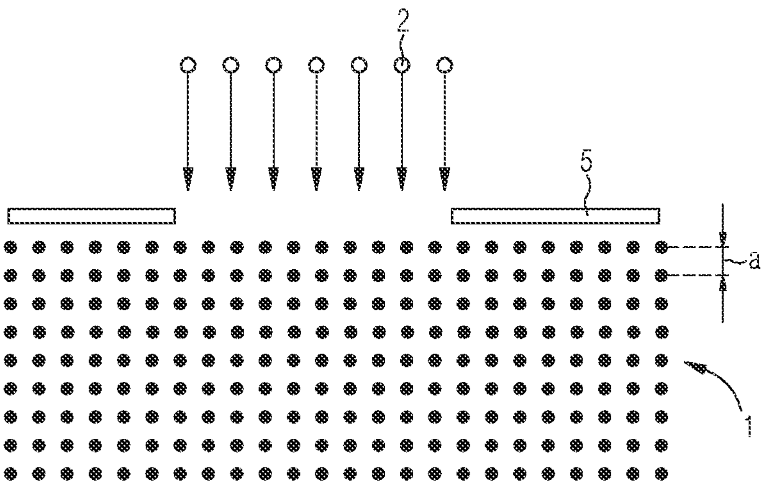
FIG. 1 shows a schematic illustration of a method step in the method for producing the diffractive optical element.

In the method step for producing a diffractive optical element shown in FIG. 1, ions 2 are implanted into the surface of a substrate 1. The substrate 1 is preferably a single crystal. For example, the substrate 1 is a silicon substrate. In the example, the substrate comprises lattice planes with a lattice plane spacing a in the vertical direction. However, the method can alternatively be applied to amorphous substrates.

In the example shown here, the ions 2 are implanted directly into the substrate 1. Alternatively, however, it would also be possible for a layer or layer system to be applied to the substrate 1 prior to the ion implantation. In this case, the ions 2 are implanted into the layer, layer system or underlying substrate. For example, a layer or layer system for reflecting EUV or X-rays can be applied to the substrate 1.

In the method, the ions 2 are advantageously implanted into the substrate 1 in a location-dependent manner. In particular, an implantation profile varying in lateral direction, i.e. parallel to the surface of the substrate 1, is generated. For this purpose, a mask layer 5 is advantageously applied prior to ion implantation. The mask layer 5 can be a metal layer that is not penetrated by the ions during ion implantation. For example, the mask layer 5 is a chromium layer or a gold layer. However, the mask layer may also comprise other materials such as metal oxides, polymers or resists. As an alternative to the use of a mask layer 5, it is possible for a laterally limited ion beam to be guided over the substrate surface in a location-dependent manner with varying ion fluence. In FIG. 1, for a simplified illustration of the principle, only one opening in the mask layer 5 is shown, with which an elevation of the surface structure to be generated is produced. In fact, the mask layer 5 may comprise a plurality of such openings, which may in particular form a periodic lattice structure. The lattice structure may comprise, for example, a lattice constant in the region of 50 nm to 500 nm.

Figure 2:
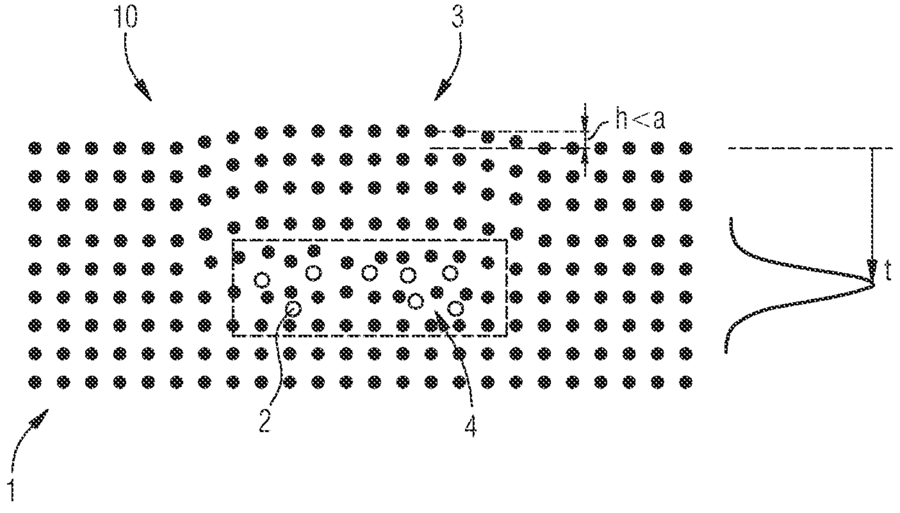
FIG. 2 shows a schematic illustration of a cross-section through an example of the diffractive optical element.

FIG. 2 illustrates the substrate 1 after implantation of the ions 2. The ions 2 implanted in the substrate 1 cause the formation of a surface structure 3. In particular, the surface is raised above an ion implantation region 4. The elevation occurs by volume change due to the creation of defects in the crystal lattice of the substrate 1 and the resulting changes in bond lengths and/or density. The achievable structure height of the surface structure 3 thus depends on the spatial extent as well as the depth position of the ion implantation region 4 and is conditioned by the type of crystal defects (e.g. point defects such as vacancies, interstitial and substitutional atoms, dislocations, stacking faults, amorphized regions).

In FIG. 2, a depth profile of the implanted ions 2 is schematically illustrated next to the substrate 1. The concentration of the implanted ions 2 as a function of depth can be precisely and specifically adjusted by the choice of implantation parameters (ion type, ion energy, ion fluence, irradiation temperature) or by subsequent temperature treatment. The ion implantation depth is preferably between 10 nm and 500 nm. The ion implantation depth is understood here to be the depth t at which the ion concentration comprises its maximum. The ion implantation depth depends in particular on the ion energy of the ions used. This is preferably between 2 keV and 100 keV. The implanted ions can be, for example, noble gas ions such as argon ions or helium ions, which do not affect the further physical properties of the material, or substitution atoms of the material of the substrate, the layer or the layer system.

By a location-dependent implantation of the ions 2, an elevation of the surface can be structured with high local resolution and thus the surface structure 3 can be generated. When using a single crystal substrate 1, the method can advantageously obtain the crystal structure at the surface of the substrate 1. By controlling the implantation parameters, the parameters of a subsequent temperature treatment, and taking advantage of the smoothing properties of a crystalline layer overlying the ion implantation region 4, the tension of the lattice planes in the direction towards the surface can be controlled.

In the method, a structure height h corresponding to a non-integer multiple of the lattice plane spacing a of the material of substrate 1 can advantageously be realized. The structure height his preferably between 0.1 nm and 10 nm. In particular, the structure height may be less than 5 nm or even less than 1 nm. An advantage of the method described herein is, in particular, that such low structure heights of the surface structure 3 can be produced with high accuracy and spatial resolution. This would not be readily possible with an etching process. In particular, the produced structure height h can be smaller than the lattice plane spacing a of the substrate 1. In contrast, with an etching process, only structure heights that are not smaller than the lattice plane spacing a can be obtained.

In particular, the substrate 1 with the surface structure 3 produced with the method forms a diffractive optical element 10.

Figure 3:
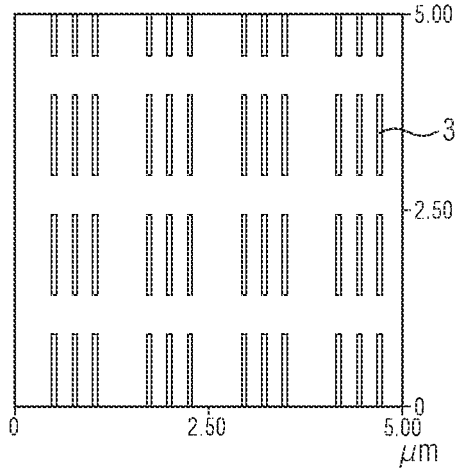
FIG. 3 shows an atomic force microscopy image of a section of the surface structure in an example of a diffractive optical element.

FIG. 3 illustrates an atomic force microscopy image showing a section of a surface structure 3 which may be part of a diffractive optical element 10. The image section shows an area of 5 μm×5 μm. The surface structure 3 comprises four lines with stripe structures whose structure height increases from bottom to top in the FIG. 3.

Figure 4:
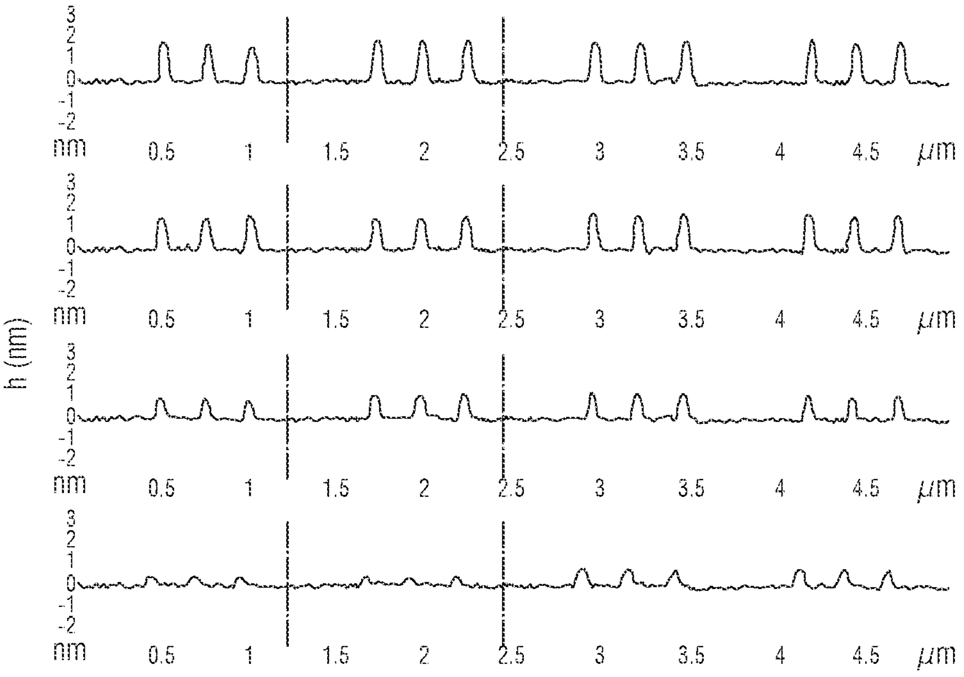
FIG. 4 shows an illustration of a height profile of the example of FIG. 3.

A height profile of the surface structures 3 is illustrated in FIG. 4. In FIG. 4 it can be seen that the surface structures 3 comprise structure heights h of less than 2 nm (top row) to less than 1 nm (bottom row).

The invention is not limited by the description based on the exemplary embodiments. Rather, the invention encompasses any new feature as well as any combination of features, which in particular includes any combination of features in the patent claims, even if that feature or combination itself is not explicitly specified in the patent claims or exemplary embodiments.

The invention claimed is:

1. A method for producing a diffractive optical element, the method comprising:

generating a surface structure by implanting ions into an implantation region of a material of a substrate, a layer or a layer system, wherein the implanted ions cause a volume change in the implantation region leading to an elevation of a surface and thus to a formation of the surface structure comprising a structure height of less than 10 nm, and wherein the surface structure is generated without etching the material of the substrate, of the layer or of the layer system.

2. The method according to claim 1, wherein the surface structure is generated with the structure height varying in lateral direction.

3. The method according to claim 1, wherein implanting the ions comprises implanting the ions through a patterned mask layer.

4. The method according to claim 1, wherein implanting the ions comprises implanting the ions by a laterally confined ion beam, and wherein an ion fluence of an ion beam is varied during the ion implantation.

5. The method according to claim 1, wherein the ions are implanted to an implantation depth between 10 nm and 500 nm, inclusive.

6. The method according to claim 1, wherein an ion energy during the ion implantation is between 2 keV and 100 keV.

7. The method according to claim 1, wherein the structure height of the surface structure is a non-integer multiple of a lattice plane spacing of the material.

8. The method according to claim 1, wherein the structure height of the surface structure is smaller than a grating plane spacing of the material at the surface or is smaller than a thickness of a single layer of the layer system of the diffractive optical element.

9. A diffractive optical element comprising:

a surface structure in a material of a substrate, a layer or a layer system, wherein the substrate, the layer or the layer system comprises an ion implantation region below the surface structure, wherein a changed volume in the ion implantation region is based on an ion implantation, wherein the changed volume provides an elevation of a surface of the ion implantation region, wherein the surface structure comprises the elevation of the surface having a structure height of less than 10 nm, wherein the structure height of the surface structure is a non-integer multiple of a lattice plane spacing of the material, and wherein the lattice plane spacing is a spacing in a direction perpendicular to the substrate.

10. The diffractive optical element according to claim 9, wherein the diffractive optical element is a reflection diffraction grating.

11. The diffractive optical element according to claim 9, wherein an ion implantation depth is between 10 nm and 500 nm, inclusive.

12. The diffractive optical element according to claim 9, wherein the structure height of the surface structure is less than a grating plane spacing of the substrate or is less than a thickness of a single layer of the layer system.

13. The diffractive optical element according to claim 9, wherein the substrate is a single crystal or an amorphous substrate.

14. The diffractive optical element according to claim 9, wherein the layer or the layer system is a mirror for EUV radiation or X-rays.

15. The diffractive optical element according to claim 9, wherein the structure height of the surface structure is a non-integer multiple of a thickness of a single layer of the layer system of the diffractive optical element.

16. The diffractive optical element according to claim 9, wherein the elevation of the surface has the structure height of less than 1 nm.

17. The method according to claim 1, wherein the structure height of the surface structure is a non-integer multiple of a thickness of a single layer of the layer system of the diffractive optical element.

18. The method according to claim 1, wherein the surface structure comprises the structure height of less than 1 nm.

* * * * *